United States Patent [19]

Sisk, Jr. et al.

[11] E Re. 28,650

[45] Reissued Dec. 16, 1975

[54] ADJUSTABLE SPEED AIR DRIVE-AIR SWEEP FOR AIR CONDITIONER

[75] Inventors: George W. Sisk, Jr.; Arthur W. Miller; Frank Koleszar, all of Evansville, Ind.

[73] Assignee: Whirlpool Corporation, Benton Harbor, Mich.

[22] Filed: Oct. 19, 1973

[21] Appl. No.: 407,981

Related U.S. Patent Documents

Reissue of:

[64] Patent No.: 3,677,166
Issued: July 18, 1972
Appl. No.: 33,403
Filed: Apr. 30, 1970

[52] U.S. Cl. ..... 98/94; 62/262; 98/94; 415/125

[51] Int. Cl.[2] ..... E06B 7/02

[58] Field of Search ..... 62/262; 98/94, 110, 116; 415/125, 148

[56] References Cited

UNITED STATES PATENTS

| | | | |
|---|---|---|---|
| 2,252,788 | 8/1941 | Sparr | 416/197 |
| 2,279,425 | 4/1942 | Voysey | 415/148 |
| 2,706,596 | 4/1955 | Hait | 415/125 |
| 2,979,305 | 4/1961 | Kwiatek | 416/197 UK |

FOREIGN PATENTS OR APPLICATIONS

| | | | |
|---|---|---|---|
| 206,409 | 2/1957 | Australia | 415/125 |
| 918,017 | 2/1963 | United Kingdom | 415/148 |

*Primary Examiner*—William F. O'Dea
*Assistant Examiner*—Ronald C. Capossela
*Attorney, Agent, or Firm*—Wegner, Stellman, McCord, Wiles & Wood

[57] ABSTRACT

A variable directing apparatus for a fluid stream that may be used, for example, to direct air emerging from a room air conditioner. The apparatus includes movable directing means for changing the direction of the fluid stream and a fluid propelled rotatable device in a portion of the fluid stream for moving the directing means. The apparatus also has an adjustable fluid blocking device for blocking the stream to the rotatable device to a desired degree so as to regulate the speed of rotation of the rotatable means and thus the speed of movement of the movable fluid directing device.

14 Claims, 4 Drawing Figures

INVENTORS
GEORGE W. SISK JR.
FRANK KOLESZAR
ARTHUR W. MILLER

BY Hofgren, Wegner, Allen, Stellman + McCord
ATTORNEY

INVENTORS
GEORGE W. SISK JR.
FRANK KOLESZAR
ARTHUR W. MILLER

BY Hoffman, Wasserman, Allen, Stellman & McCord
ATTORNEY

ADJUSTABLE SPEED AIR DRIVE-AIR SWEEP FOR AIR CONDITIONER

Matter enclosed in heavy brackets [ ] appears in the original patent but forms no part of this reissue specification; matter printed in italics indicates the additions made by reissue.

BACKGROUND OF THE INVENTION

Such apparatus as room air conditioners and the like ordinarily provide a blast of air that is directed in a fixed direction into an enclosure such as a room. This invention provides a device for changing the direction of the air so as to sweep the room or other space so that the effect is very much like an oscillating fan.

FIELD OF THE INVENTION

One of the features of this invention is to provide a variable directing apparatus for a fluid stream in which the direction of the stream is continually changed by using the energy of a portion of the stream itself, together with means for partially or completely blocking this portion of the stream to control the rate of change, or to stop it entirely.

Another feature of the invention is to provide a brake means in conjunction with the above apparatus for locking the fluid directing apparatus against movement when the blocking device is in full blocking position.

THE DRAWINGS

DESCRIPTION OF THE DISCLOSED EMBODIMENT

Figure 1:
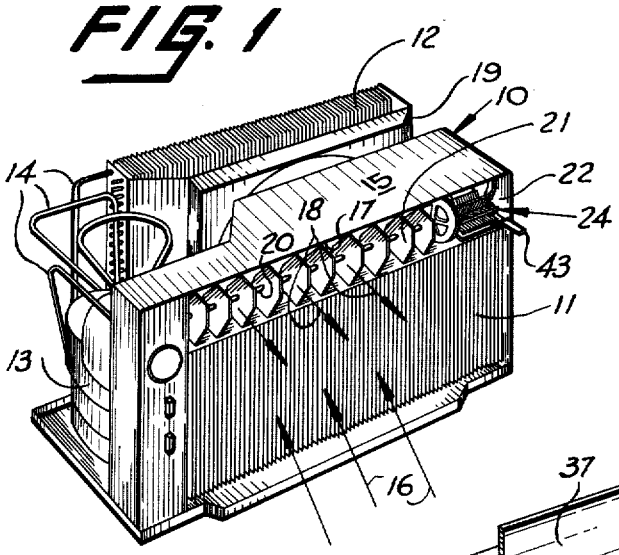
FIG. 1 is a perspective view of a room air conditioner with the housing and the decorative front omitted.

The air conditioner 10 of FIG. 1 which is here shown with the decorative front and enclosing housing removed comprises an evaporator 11, condenser 12, compressor 13 and interconnecting tubing 14. In addition, the interior of the conditioner 10 is divided by a baffle structure 15 to provide a cool air flow section in which air is drawn through the finned evaporator 11 inwardly from the room as indicated by the arrows 16 and exhausted outwardly through a long narrow outlet 17 extending most of the way across the top of the front of the conditioner. This outlet 17 constitutes means defining a flowing fluid stream as indicated by the incoming stream 16 and by the chilled outgoing stream from the outlet 17 as indicated by the arrows 18.

In addition, the rear condenser which is arranged to be cooled by exterior air is arranged in its own baffle structure 19 so that exterior air can be forced over the condenser 13 for dissipating the heat extracted from the room being conditioned. As is customary, separate motor operated blower and fan (not shown) are used to set up the evaporator and condenser air streams respectively.

Ordinarily, the chilled emerging air 18 which is directed back into the room flows in one general direction. However, in the structure illustrated here, there is provided movable fluid directing means for changing the direction of the emerging stream 18 on movement of the directing means. As illustrated, the fluid directing means comprises a rotatable shaft 20 within the outlet chamber 17 on which is mounted a series of spaced inclined but parallel disks 21. As the shaft 20 is rotated the inclination of the parallel disks 21 to the axis of the horizontal shaft 20 causes the direction of the air stream 18 to be changed continually during the rotation.

In a separate outlet chamber portion 22 at one end of chamber 17 there is positioned a fluid propelled rotatable means 24 which uses a portion of the emerging stream 18 that flows through this outlet chamber portion 22 to rotate the shaft 20 so that the energy of the air stream itself is used to operate the fluid directing means embodied in the shaft 20 and the spaced inclined disks 21. In addition, the device 24 includes an adjustable fluid braking means 25 here embodied as a flat plate for blocking the auxiliary stream in the chamber 22 to a selected variable degree thereby to regulate the speed of rotation of the device 24 and thus the speed of rotation of the fluid directing means 21.

The rotatable device 24 includes a series of radially extending paddles 26 and 27 angularly spaced about a shaft 28. Air flowing outwardly from the outlet chamber portion 22 as indicated by the arrows 29 in FIG. 2 strikes the paddles 26 and 27 successively to rotate the shaft 28 in a counterclockwise direction as viewed from the left of FIG. 2. This air induced rotation of the shaft 28 operates through a gear train that reduces the speed so that even though the shaft 28 will be operated rapidly the shaft 20 will rotate much more slowly. Thus the gear train includes a small gear 30 mounted directly on the end of the paddle shaft 28 and the gear 30 meshes with a much larger gear 31 mounted on one end of the cross shaft 32 for rotation thereof with this cross shaft carrying another small gear 33 which in turn meshes with another large gear 34 which is mounted directly on the adjacent end of the fluid directing shaft 20. To provide the proper mounting of these various gears and shafts as well as the other portions of the operating structure there is provided a vertical wall 23 and a spaced second vertical wall 35 so that the two walls 23 and 35 are substantially parallel. The successive paddles 26 and 27 are positioned between these walls and the shafts 28 and 32 extend therebetween.

Figure 2:
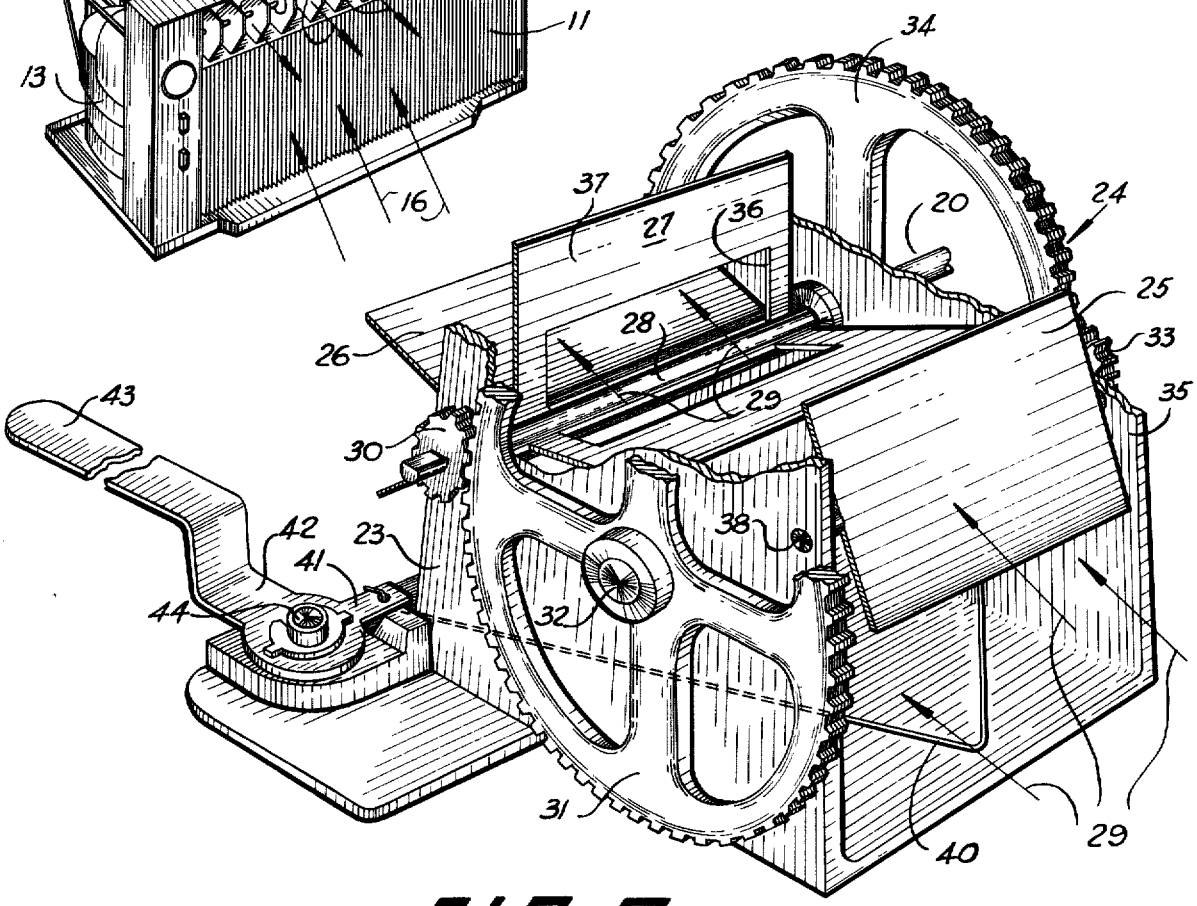
FIG. 2 is a fragmentary enlarged perspective view of a portion of the apparatus of FIG. 1 as viewed from the interior of the conditioner toward the front thereof.
Figure 3:
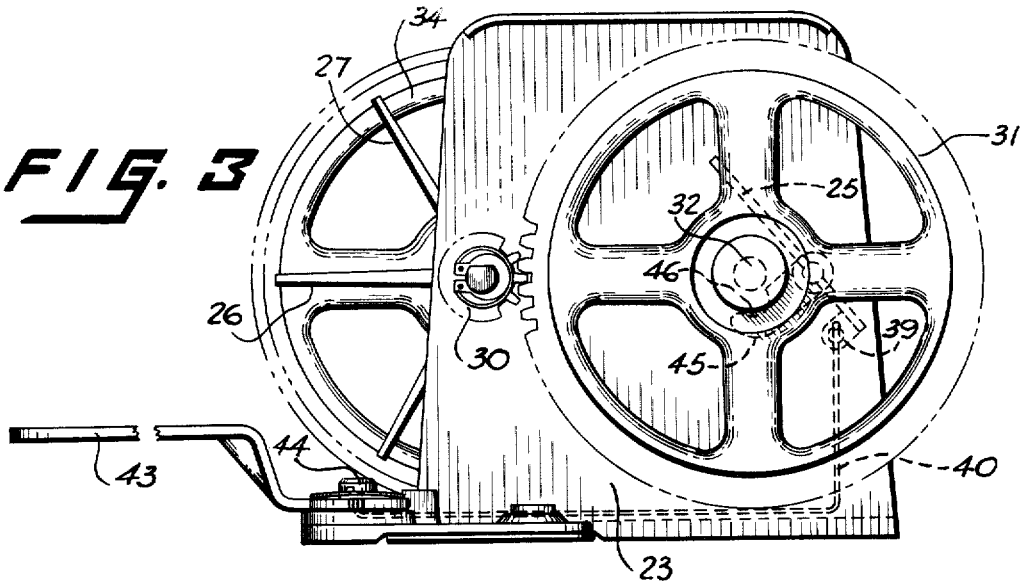
FIG. 3 is a side elevational view of the apparatus of FIG. 2.
Figure 4:
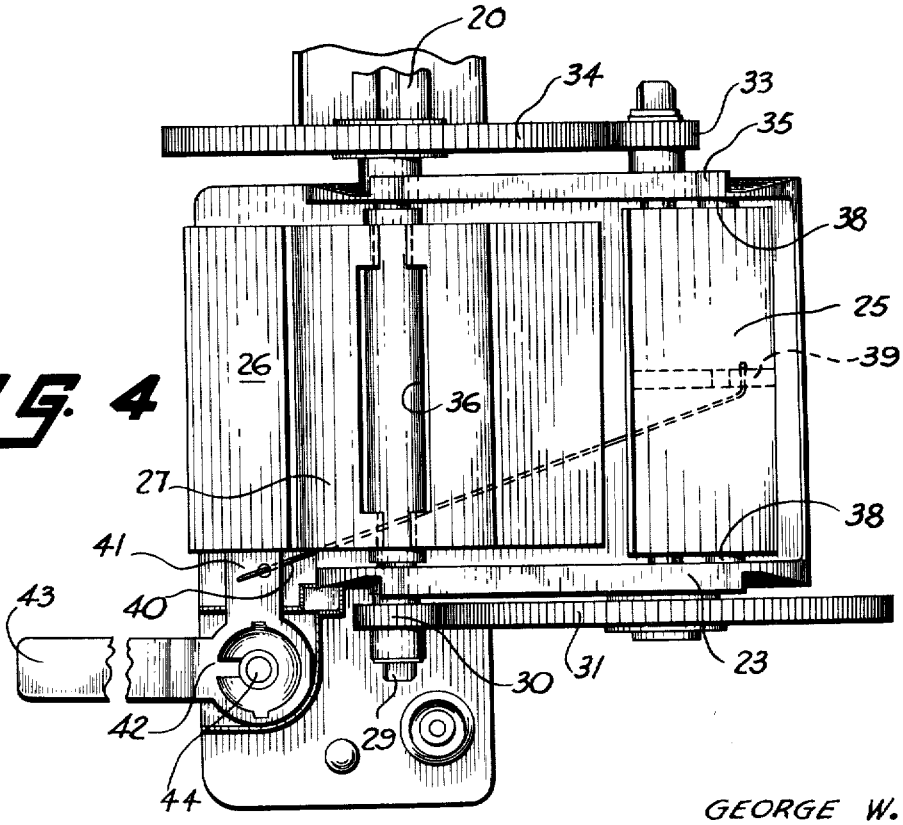
FIG. 4 is a plan view of the apparatus of FIG. 3.

Certain of the series of paddles 26 and 27 are provided with fluid permeable opening means for permitting direct impingement of the fluid indicated by the arrows 29 in FIG. 2 on successive paddles by way of these openings. Thus in FIG. 2 two types of paddles are illustrated, with the one type 26 being solid and the other type 27 being provided with a transverse opening 36 located adjacent the axle or shaft 28. With this arrangement the air flowing outwardly through the outlet chamber portion 22 can strike the solid paddles 26 and exert force thereon by flowing through the openings 36 in the paddles 27 that contain these openings. In addition, of course, the air will strike the solid portions 37 of the paddles 27 above their openings 36. The result is that the paddles 26 and 27 in the full set are acted upon successively as they are rotated into vertical position so that the rotation of these paddles with their mounting shaft 28 rotates the shaft 20 and disks 21 to change continually the direction of flow of the chilled air 18. Because of the provision of the gear train 30, 31, 33 and 34 the paddles 26 and 27 can rotate at relatively high speed with the shaft 20 and disks 21 rotating at much slower speed. In order to regulate the speed of rotation of the shaft 20 and thus the rate that the air stream 18 is deflected through its full path of movement the previously mentioned flat plate 25 is provided. This plate as is indicated in FIG. 2 is in position to block to the desired degree the auxiliary air stream 29 flowing outwardly forwardly from the auxiliary outlet chamber 22. In order to accomplish this the plate 25 is mounted on stub shafts 38 at each end of the plate with each stub shaft being held in a corresponding side wall 23 and 35 as shown in FIG. 4. The plate therefore is arcuately movable with these shafts 38 from a substantially vertical position where essentially all air flow to the paddles 26 and 27 is blocked to a generally horizontal position where very little of the air flow is blocked. In FIGS. 2 and 3 the flat plate 25 is shown in intermediate position.

In order to move the plate 25 through its entire range of positioning the lower edge of the plate is provided at about its midpoint with a rearwardly extending eyelet 39. Engaging this eyelet is one end of a wire 40 which extends downwardly as shown in FIG. 4 to engage one end 41 of a right-angled bell crank 42 whose other end 43 extends forwardly from the air conditioner 10 as shown in FIG. 1 to provide an operating handle means. With this arrangement the bell crank 42 can be rotated by its handle end 43 about its mounting stud 44 to position the barrier plate 25 as desired and thus regulate the rate of rotation of the angled spaced disks 21 and thus the rate of oscillation of the emerging air stream 18.

Extending forwardly of the plate 25 is a projecting brake 45 which is in the form of a lever fixed at generally right angles to the plate 25. This brake has on its upper surface a generally semicircular braking cavity 46 which when the barrier plate 25 is in vertical or substantially complete blocking position engages the bottom half of cross shaft 21 and locks this shaft against rotation. This, or course, locks the air directing means shaft 20 and disks 21 thereon against rotation.

The provision of the opening 36 in alternate paddle wheels 27 permits air to pass therethrough to impinge on the surface of the next paddle 26 which would otherwise be masked by the upstream paddle. This permits a more compact drive mechanism as a greater effective surface area of the paddles subjected to the air stream is presented to the stream under practically all operating conditions. As noted earlier, when plate 15 is moved to substantially horizontal position it provides substantially no blocking action to the air stream 29. The speed of operation of the fluid stream directing apparatus is reduced by raising the plate 25 from its horizontal position to mask the paddles 26 and 27 which, of course, are upstream of the plate. The masking effect of the plate 25 is effective to greater and greater degrees as the plate is moved toward the vertical since the plate not only blocks air flow to the paddles themselves but also blocks the openings 36 which are adjacent the axis of rotation of the paddle structure.

Having described the invention, the embodiments of the invention in which an exclusive property or privilege is claimed are defined as follows:

1. In a variable directing apparatus for a fluid stream having means for defining a flowing fluid stream, movable fluid directing means for cyclically changing the direction of said stream on movement of said directing means, and fluid propelled rotatable means in said stream for moving said directing means due to a fluid force-caused rotation of said rotatable means, the improvement comprising adjustable means for adjustably regulating the speed of rotation of said rotatable means by said fluid stream and thus the movement of said fluid directing means.

2. The apparatus of claim 1 wherein said directing means comprises means rotatable with said fluid propelled rotatable means.

3. The apparatus of claim 2 wherein said rotatable means is provided with spaced paddles positioned in said fluid stream for rotating said rotatable means and thus said directing means.

4. The apparatus of claim 3 wherein certain of said paddles define fluid permeable opening means for permitting direct impingement of said fluid stream by way of said openings on successive paddles.

5. The apparatus of claim 4 wherein said paddles are arranged in radiating series around an axis and said opening means provided adjacent said axis.

6. The apparatus of claim 1 wherein said [ blocking ] *adjustable* means comprises an adjustable deflector movable between extreme positions of a position of substantially complete blocking of the air flow to said rotatable means for preventing substantial rotation thereof and a substantially non-blocking position to permit full impingement of said fluid stream portion on said fluid propelled rotatable means.

7. Variable directing apparatus for a fluid stream, comprising: means for defining a flowing fluid stream; movable fluid directing means for changing the direction of said stream on movement of said directing means; fluid propelled rotatable means in said stream for moving said directing means due to the fluid force-caused rotation of said rotatable means; adjustable fluid blocking means for blocking said stream to said rotatable means to a selected variable degree thereby to regulate the speed of rotation of said rotatable means and thus the movement of said fluid directing means, said blocking means comprising an adjustable deflector movable between extreme positions of a position of substantially complete blocking of the air flow to said rotatable means for preventing substantial rotation thereof and a substantially non-blocking position to permit full impingement of said fluid stream portion on said fluid propelled rotatable means; and a brake means operatively engaging said rotatable means when said blocking means is in its substantially complete blocking position for locking the rotatable means against rotation.

8. The apparatus of claim 7 wherein there are provided operating handle means on said directing apparatus accessible from the exterior thereof for said adjusting of the fluid blocking means and interconnecting apparatus between said handle means and said adjustable fluid blocking means and said brake means for applying said brake means upon movement of said fluid blocking means to substantially completely blocking position.

9. The apparatus of claim 8 wherein certain of said paddles are provided with fluid permeable opening means for permitting direct impingement of said fluid on successive paddles.

10. The apparatus of claim 1 wherein said rotatable means is provided with spaced fluid flow responsive means positioned in said fluid stream for rotating said rotatable means and thus said directing means.

11. The apparatus of claim 1 wherein said adjustable means comprises adjustable fluid blocking means having an operating handle adjacent said movable fluid directing means for blocking said stream to said movable means to a selected variable degree thereby to regulate the speed of movement of said movable means and thus the movement of said fluid directing means.

12. In a variable directing apparatus for a fluid stream having means for defining a flowing fluid stream, movable fluid directing means for changing the direction of said stream on movement of said directing means, and fluid propelled movable means in said stream for moving said directing means due to a fluid force-caused movement of said movable means, the improvement comprising adjustable fluid blocking means for blocking said stream to said movable means to a selected variable degree thereby to regulate the speed of movement of said movable means and thus the movement of said fluid directing means; and means for dividing said stream into separate portions and directing one portion to said fluid directing means and the other portion to said movable means, said fluid blocking means being disposed to control the flow of only said second stream portion.

13. In a variable directing apparatus for a fluid stream having means for defining a flowing fluid stream, movable fluid directing means for changing the direction of said stream on movement of said directing means, and fluid propelled movable means in said stream for moving said directing means due to a fluid force-caused movement of said movable means, the improvement comprising: adjustable fluid blocking means for blocking said stream to said movable means to a selected variable degree thereby to regulate the speed of movement of said movable means and thus the movement of said fluid directing means; and means for dividing said stream into separate portions and directing one portion to said fluid directing means and the other portion to said movable means, said fluid directing means and movable means being disposed in side-by-side relationship.

*14. Air flow control apparatus comprising:*

*means defining a port through which a stream of air may flow;*

*air deflecting means disposed in the air stream caused to flow through said port;*

*means supporting said air deflecting means for movement in said air stream;*

*air-driven turbine means including a rotary impeller positioned for rotation by said air stream;*

*means operably coupling said turbine means and said air deflecting means to effect, on impingement of air on said impeller, movements of said deflecting means;*

*shield means manually adjustable to a plurality of positions in the air stream flowing over said rotary impeller and effective in such positions to control the quantity of air flowing over said impeller, and thereby to control the rate of movement of said air deflecting means; and*

*means upstream of said impeller for producing a flow of air through said port.*

* * * * *